United States Patent [19]
Otake

[11] Patent Number: 5,930,124
[45] Date of Patent: Jul. 27, 1999

[54] SWITCHING POWER SUPPLY

[75] Inventor: Tetushi Otake, Tokyo, Japan

[73] Assignee: Toko, Inc., Tokyo, Japan

[21] Appl. No.: 08/984,727

[22] Filed: Dec. 4, 1997

[30] Foreign Application Priority Data

Dec. 13, 1996 [JP] Japan ..................................... 8-352701
Dec. 20, 1996 [JP] Japan ..................................... 8-354674

[51] Int. Cl.⁶ ............................. H02M 3/335; G05F 1/00
[52] U.S. Cl. ................................ 363/21; 363/20; 315/307
[58] Field of Search ................................. 363/21, 20, 24, 363/16, 97; 315/274, 276, 307

[56] References Cited

U.S. PATENT DOCUMENTS 4,017,761   4/1977   Woldring ................................... 315/99

FOREIGN PATENT DOCUMENTS 61-29226    7/1986   Japan .
62-30465    8/1987   Japan .
 8-66017    3/1996   Japan .
 8-294275  11/1996   Japan .

Primary Examiner—Peter S. Wong
Assistant Examiner—Rajnikant B. Patel
Attorney, Agent, or Firm—Frishauf, Holtz, Goodman, Langer & Chick, P.C.

[57] ABSTRACT

A switching power supply is provided in which the efficiency is improved and the regulation and cross-regulation of an output voltage is also improved. Terminals (A) and (B) of a primary winding N1 and secondary winding N2 at which the same polarity is set are interconnected via a first capacitor C4. A tap provided at a given winding position (C) of the primary winding N1 and the other terminal (D) of the secondary winding N2 are interconnected via a second capacitor. Herein, assuming that areas of the primary winding N1 divided by the tap are $N_{11}$ and $N_{12}$, the number of turns in the area $N_{11}$ between the terminal (A) and winding position (C) is nearly the same with the number of turns existing between the one terminal (B) of the secondary winding N2 and the other terminal (C) thereof. Owing to the configuration, an equivalent coupling coefficient observed between the primary winding N1 and secondary winding N2 approaches 1.0. Consequently, the efficiency of a power supply can be improved, and regulation and cross-regulation can be improved.

12 Claims, 5 Drawing Sheets

SWITCHING POWER SUPPLY

BACKGROUND OF THE INVENTION

The present invention relates to a switching power supply which has a high efficiency and improves the cross-regulation and regulation of an output voltage.

Recent electronic equipment often requires a multi-output type power supply as a power supply to be incorporated therein. This is because various kinds of recently-developed electronic devices and active parts often require a plurality of driving voltages or control voltages having different voltage values.

Assume a fluorescent display tube as an electronic device requiring a plurality of driving voltages or control voltages for its operations.

A multi-output type switching power supply having the circuitry shown in FIG. 1 has been available as a power supply for supplying power to the fluorescent display tube.

The switching power supply PS shown in FIG. 1 generally operates as described below.

When an input voltage $V_{IN}$ is applied to a series circuit composed of a primary winding N1 of a transformer T1 and a switching transistor Q1 via input terminals 1a and 1b, the circuit shown in FIG. 1 starts operating. At this time, the switching transistor Q1 turns on or off alternately in response to a pulse signal sent from a control circuit CONT. This causes a current passing through the primary winding N1 to be conducted or cut off. Repetition of conduction and cutoff of a current induces a voltage in each winding of the transformer T1.

A synthetic voltage of the voltage induced in the primary winding N1 and the input voltage $V_{IN}$ arises at a node between the primary winding N1 and an anode of a diode D1. The synthetic voltage is rectified and smoothed by the combination of the diode D1 and a capacitor C2. A dc voltage present at the terminals of the capacitor C2 is conducted as a first output voltage $V_{O1}$ to first output terminals 2a and 2b. Likewise, a voltage induced in a secondary winding N2 is rectified and smoothed by the combination of the diode D2 and a capacitor C3. A dc voltage present at the terminals of the capacitor C3 is conducted as a second output voltage $V_{O2}$ to second output terminals 3a and 3b. The first output voltage $V_{O1}$ and second output voltage $V_{O2}$ are supplied to a drive circuit DR for display-controlling a fluorescent display tube FIT and to the filament of the fluorescent display tube FIT.

The first output voltage $V_{O1}$ is controlled by the control circuit CONT for detecting a dividing voltage of the voltage $V_{O1}$ arising at a node between resistors R1 and R2 and varying the on-duty of the switching transistor Q1 according to the dividing voltage so that the first output voltage $V_{O1}$ will remain constant. By contrast, the second output voltage $V_{O2}$ is theoretically held constant due to magnetic coupling of the transformer T1 composed of the primary winding N1 and secondary winding N2 as long as the first output voltage $V_{O1}$ remains constant.

On lighting, the fluorescent display tube FIT requires potential differences between the filament and anode and between the filament and grid, respectively. The circuit shown in FIG. 1 includes a circuit portion in which a resistor R3 and constant voltage diode DZ are connected in series with each other between the first output terminals 2a and 2b, and the cathode of the constant voltage diode DZ is connected to one terminal of the filament. Due to the circuit portion, a potential difference corresponding to a Zener voltage for the constant voltage diode DZ is obtained between the filament and anode and between the filament and grid, respectively.

In the circuit shown in FIG. 1, when the fluorescent display tube FIT is in operation, the first output voltage $V_{O1}$ of the switching power supply PS is supplied to the drive circuit DR, and the second output voltage $V_{O2}$ is supplied to the filament of the fluorescent display tube FIT. At this time, a current flowing into the drive circuit DR shall be a current $I_{O1}$, and a current flowing into the filament of the fluorescent display tube FIT shall be a current $I_{O2}$.

Herein, we will explain a status of the circuit in which the states of loads that are coupled to the output voltages of the switching power supply PS are changed.

The filament of the fluorescent display tube FIT is applied to a load that remains nearly constant even when a display state is changed, while the drive circuit DR is applied to a load whose magnitude varies with a change in the display state. In particular, in controlling the display of the fluorescent display tube, a state in which the luminance of the display surface is degraded, which is referred to as "dimmer mode", may take place depending on ambient brightness. At this time, the drive circuit DR serves as a quite light load. If the state of the load changes, the current $I_{O1}$ varies. The value of the current $I_{O1}$ in the dimmer mode becomes very small compared with the one in the display state in which luminance is high.

As mentioned previously, the second output voltage $V_{O2}$ is theoretically held constant owing to magnetic coupling between the windings of a transformer as long as the first output voltage $V_{O1}$ remains constant. However, in practice, the phenomenon takes place in which even when the first output voltage $V_{O1}$ is controlled to remain constant by means of the control circuit CONT, if the value of the current $I_{O1}$ becomes very small, the second output voltage $V_{O2}$ decreases. This phenomenon is realized to change as described below according to a coupling coefficient observed between the first winding N1 and secondary winding N2 of the transformer T.

First, as the coupling coefficient falls below 1.0, the second output voltage $V_{O2}$ decreases to have a much smaller voltage value than an original voltage value.

However, when the coupling coefficient falls below a certain value, as the coupling coefficient decreases, the second output voltage $V_{O2}$ rises gradually and the voltage value thereof approaches the original voltage value.

Incidentally, the stability of the output voltage $V_{O2}$ against the variation of the output current $I_{O1}$ flowing into output terminals (2a, 2b) other than the output terminals (3a, 3b) to which the output voltage $V_{O2}$ is applied is referred to as cross-regulation. The larger a magnitude of variation of a voltage (magnitude of decrease) is, the poorer the cross-regulation.

Experimentally, it is known that cross-regulation exhibited in the switching power supply can be improved by setting the coupling coefficient observed between the windings of a transformer employed in the power supply to a value very close to 1.0 (for example, 0.99) or to a value far away from 1.0 (for example, 0.85). However, it is almost impossible to set the coupling coefficient observed between the windings of an actual transformer to 1.0. It is also very hard to set the coupling coefficient to a value very close to 1.0. Incidentally, a coupling coefficient observed between the windings of a typical transformer that is available is lower than 1.0 (about 0.95). Typically, when a switching power supply exhibiting high cross-regulation is needed, a coupling coefficient observed between the windings of a transformer has been set low.

However, a transformer which has a low coupling coefficient observed between the windings thereof has a drawback that a power loss of the transformer is larger than the one of a transformer which has a high observed coupling coefficient. This poses a first problem that a switching power supply using a transformer which has a low coupling coefficient observed between the windings thereof is poor in efficiency.

Moreover, the state of a load connected between the output terminals 3a and 3b of the power supply PS is, differing from the filament, not always constant. In the case that the load connected between the output terminals 3a and 3b is not a fluorescent display tube, the state of the load may change greatly. In this case, there arises a second problem that in a switching power supply using a transformer which has a low coupling coefficient observed between the windings thereof, the second output voltage $V_{O2}$ varies greatly with the variation of the current $I_{O2}$.

Incidentally, the stability of the output voltage $V_{O2}$ against the variation of the output current $I_{O2}$ flowing into the same output terminals as the output terminals to which the output voltage $V_{O2}$ is applied is referred to as regulation. The larger a magnitude of variation of a voltage is, the poorer the regulation is.

In the case of a multi-output type switching power supply having the circuitry shown in FIG. 1, at least one of the cross-regulation, efficiency, and regulation is poor according to the coupling coefficient observed between the windings of a transformer employed.

SUMMARY OF THE INVENTION

An object of the present invention is to equivalently improve a coupling coefficient observed between the windings of an inductance part such as a transformer incorporated in a power supply by modifying the circuitry of the power supply, and to simultaneously achieve improvement of the efficiency of a switching power supply and improvement of cross-regulation and regulation.

For accomplishing the above object, according to the present invention, there is provided a switching power supply including a switching device, a control circuit, and an inductance part having a plurality of windings, and producing a plurality of output voltages by using voltages induced in the windings of the inductance part by operating the switching device. In the switching power supply, as for given first and second windings of the inductance part, a winding position (A) of the first winding and a winding position (B) of the second winding are interconnected via a first capacitor, and a winding position (C) and winding position (D) of the first and second windings separated from the winding position (A) and winding position (B) by nearly the same number of turns in the direction of the same polarity are interconnected via a second capacitor.

A power supply in accordance with an typical embodiment of the present invention has the configuration described below.

To begin with, an input-stage circuit of the power supply comprises a transformer having a primary winding and secondary winding, a switching transistor, and a control circuit. A node between the primary winding and switching transistor is connected to first output terminals via a first rectification smoothing circuit. Both terminals of the secondary winding are connected to second output terminals via a second rectification smoothing circuit. One terminal (A) of the primary winding and one terminal (B) of the secondary winding are interconnected via a first capacitor. The other terminal (D) of the secondary winding and a given winding position (C) of the primary winding are interconnected via a second capacitor.

However, the one terminal (A) and one terminal (B) shall be terminals of windings at which voltages of the same polarity arise, or in other words, terminals of windings at which the same polarity is set. The winding position (C) of the primary winding is a winding position separated from the one terminal (A) by the same number of turns as the secondary winding, and is a winding position defined in the direction of the same polarity as the polarity at the other terminal (D) of the secondary winding.

A power supply according to another embodiment of the present invention has the configuration described below.

A primary winding of a transformer and a switching transistor are connected in series with each other between an input terminal and a reference potential point so that one terminal (E) of the primary winding is connected to the reference potential point. A node between the primary winding and the switching transistor is connected to a first output terminal via a rectification smoothing circuit. One terminal (F) of the secondary winding of the transformer T which has the same polarity as the one terminal (E) of the primary winding is connected to the reference potential point via a smoothing capacitor. Furthermore, the one terminal (F) of the secondary winding is connected to a second output terminal. The other terminal (G) of the primary winding and a winding position (H) of the secondary winding are interconnected via a second capacitor.

However, the winding position (H) of the secondary winding is a winding position separated from the one terminal (F) by nearly the same number of turns as the primary winding and is a winding position defined on the primary winding in the direction of the same polarity as the polarity at the other terminal (G) of the primary winding.

DESCRIPTION OF THE PREFERRED EMBODIMENT

Figure 1:
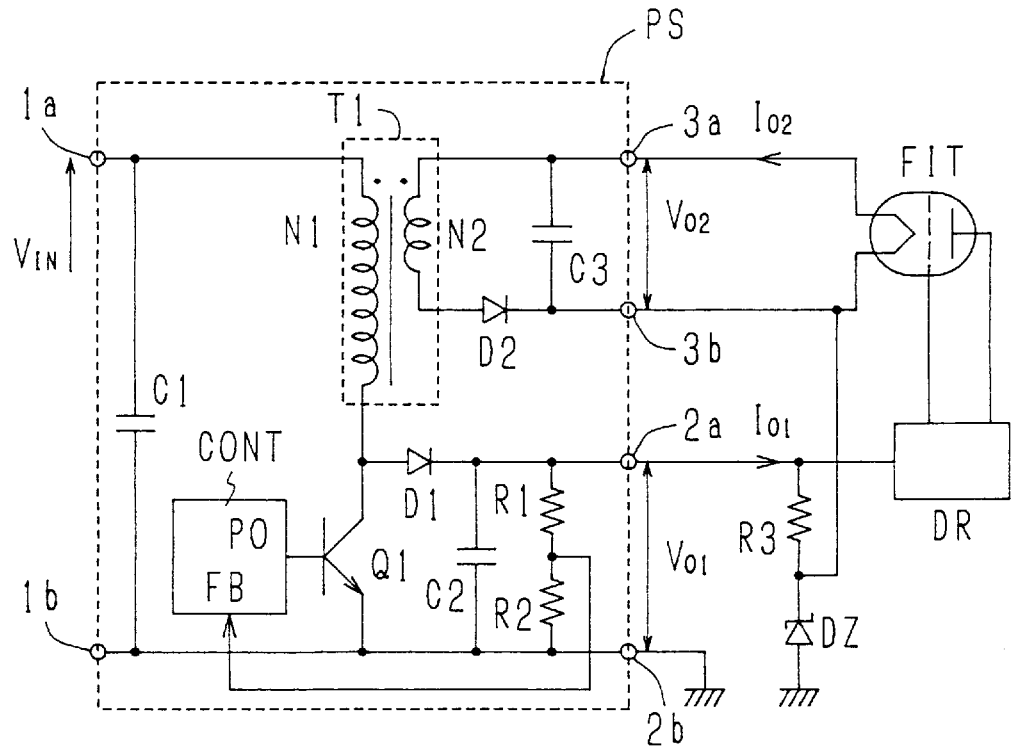
FIG. 1 is an example of a conventional circuit diagram showing a switching power supply and a load requiring supply of a plurality of voltages.
Figure 2:
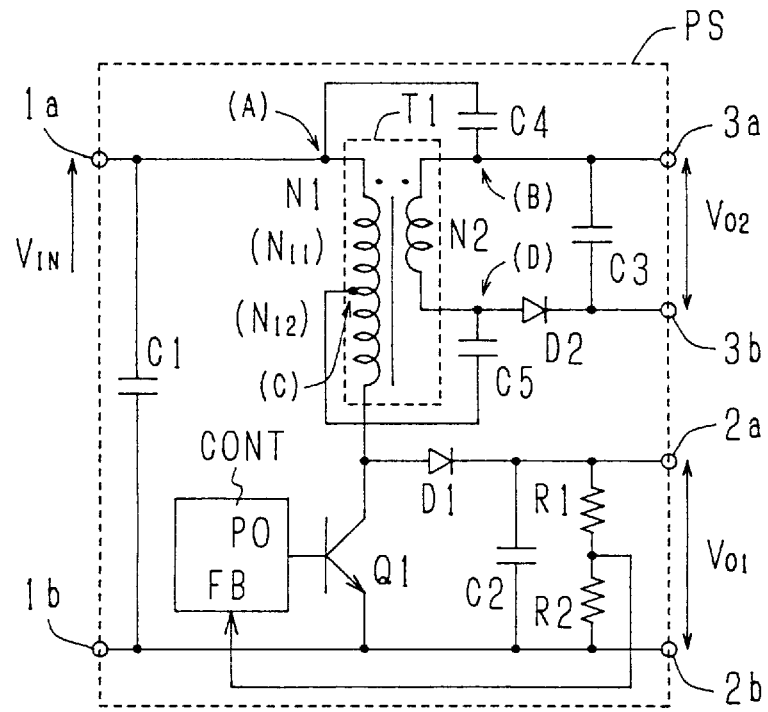
FIG. 2 is a circuit diagram showing the first embodiment of a switching power supply in accordance with the present invention in which a coupling coefficient observed between windings is improved.

The circuit diagram of FIG. 2 shows the circuitry of the first embodiment of a switching power supply in accordance with the present invention in which a coupling coefficient observed between the windings of a transformer is improved equivalently by modifying the circuitry. FIG. 2 shows only a switching power supply PS. A load device such as the fluorescent display tube FIT shown in FIG. 1 is not illustrated. Moreover, reference numerals assigned to components shown in FIG. 2 are identical to those assigned to the same components shown in FIG. 1. The same applies to the description of other embodiments.

In FIG. 2, the switching power supply PS has the configuration described below.

A primary winding N1 of a transformer T1 and a switching transistor Q1 are connected in series with each other between input terminals 1a and 1b. The base of the switching transistor Q1 is connected to a pulse output terminal PO of a control circuit CONT. A node between the primary winding N1 and switching transistor Q1 is connected to a first output terminal 2a via a diode D1. A first output terminal 2b is connected to the input terminal 1b.

A capacitor C2 is connected between first output terminals 2a and 2b, a series circuit composed of resistors R1 and R2 is connected in parallel with the capacitor C2. A node between the resistors R1 and R2 is connected to a detection terminal FB of the control circuit CONT. The primary winding N1, switching transistor Q1, diode D1, and capacitor C2 constitute a boost chopper converter circuit.

One terminal of a secondary winding N2 of the transformer T1 is connected to a second output terminal 3a, and the other terminal of the secondary winding N2 is connected to a second output terminal 3b via a diode D2. A capacitor C3 is connected between the second output terminals 3a and 3b. The secondary winding N2, diode D2, and capacitor C3 constitute a flyback converter circuit in cooperation with the primary winding N1 and switching transistor Q1.

The one terminal (A) of the primary winding N1 of the transformer T1 is connected to the one terminal (B) of the secondary winding N2, at which a voltage of the same polarity as that arisen at the one terminal (A) arises, in other words, at which the same polarity as that at the one terminal (A) is set, via a first capacitor C4. A tap located at a given winding position (C) of the primary winding N1 is connected to the other terminal (D) of the secondary winding N2 via a second capacitor C5. Herein, the primary winding N1 is divided into an area $N_{11}$ and area $N_{12}$ by the tap. The area $N_{11}$ between the winding terminal (A) of the primary winding N1 and the winding position (C) thereof has nearly the same number of turns as the secondary winding N2.

In the switching power supply PS in FIG. 2 having the foregoing circuitry, a second output voltage $V_{O2}$ is produced using a voltage induced in the secondary winding N2 due to magnetic coupling between the primary winding N1 and secondary winding N2 of the transformer T and a voltage led in the area $N_{11}$ of the primary winding N1 due to the capacitors C4 and C5.

By the way, a capacitive element exhibits high impedance with a DC component of a current, and low impedance with an AC component thereof. The capacitors C4 and C5 therefore pass only the AC component of a voltage induced in the area $N_{11}$ of the primary winding N1. As a result, the primary side and secondary side of the transformer T1 are AC-coupled. Consequently, AC power is supplied from the primary side to the secondary side. As already known, magnetic coupling exists between the primary winding N1 and secondary winding N2 of the transformer T. Owing to the magnetic coupling, AC power is supplied from the primary side to the secondary side.

Figure 3:
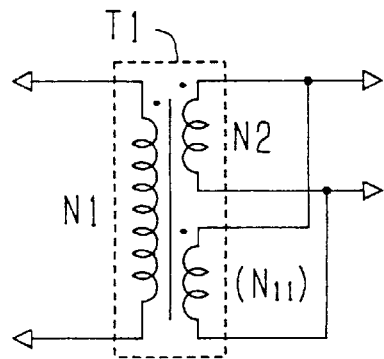
FIG. 3 is an equivalent circuit diagram in which a transformer, first capacitor and second capacitor are regarded as one transformer.

The operation of two transmissions of AC power will be discussed. The circuit portion composed of the transformer T1 and capacitors C4 and C5 can be regarded as one transformer whose equivalent circuit has the circuitry shown in FIG. 3. Specifically, the transformer has the primary winding N1 as an input winding and has two windings, the secondary winding N2 and the winding in the area $N_{11}$ which are connected in parallel with each other as an output winding magnetically coupled with the input winding.

A coupling coefficient (equivalent coupling coefficient) observed between the input winding and output winding in the equivalent circuit covers an actual coupling coefficient observed between the primary winding N1 and secondary winding N2 and a hypothetical coupling coefficient observed between the primary winding N1 and area $N_{11}$. The equivalent coupling coefficient is higher than a coupling coefficient observed when the output winding is only a secondary winding N2, and has a value close to 1.0.

Consequently, when given winding positions of the primary winding N1 and secondary winding N2 of the transformer T1 are interconnected via the capacitors C4 and C5, the equivalent coupling coefficient observed between the primary winding N1 and secondary winding N2 is improved greatly in comparison with the one observed when the capacitors C4 and C5 are not connected. When the coupling coefficient observed between the primary winding N1 and secondary winding N2 of the transformer T1 is improved, the efficiency of the power supply PS shown in FIG. 2 is improved, and simultaneously the regulation and cross-regulation of the second output voltage $V_{O2}$ are improved.

When the diode D1, capacitor C2, and output terminals 2a and 2b are excluded from the circuit shown in FIG. 2, if the series circuit composed of the resistors R1 and R2 is connected between the output terminals 3a and 3b, a single-output type switching power supply for providing only an output voltage $V_{O2}$ is constituted. The efficiency of such a single-output type switching power supply is expected to be improved by connecting the capacitors C4 and C5. When the secondary winding N2 is divided by an intermediate tap, a switching power supply capable of providing a plurality of output voltages can be constituted though it has the same circuitry as the single-output type switching power supply. When the present invention is implemented, the efficiency of such a power supply is expected to be improved.

Figure 4:
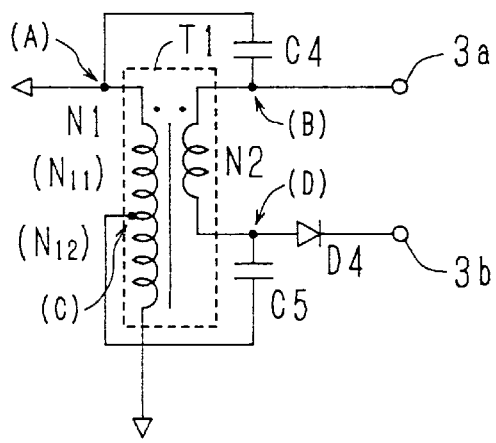
FIG. 4 is a partial circuit diagram of the second embodiment of a switching power supply in accordance with the present invention.

FIG. 4 shows part of the circuitry of the second embodiment of a switching power supply in accordance with the present invention. FIG. 4 shows only an output-stage circuit portion beyond the transformer T1 and secondary winding N2 of the transformer T1. The other circuit elements and the connections thereof that are not illustrated are identical to those in the circuit shown in FIG. 2.

The circuit shown in FIG. 4 has substantially the same circuitry as that shown in FIG. 2 but does not include the smoothing capacitor C3.

In the circuit shown in FIG. 2, the second output voltage $V_{O2}$ is a DC voltage produced by rectifying and smoothing a voltage induced in the secondary winding N2 by means of the diode D2 and capacitor C3. However, some loads require an AC voltage. The circuit shown in FIG. 4 can supply an ac voltage to a load.

To be more specific, a high-frequency square-wave voltage is induced in the secondary winding N2 due to the operation of the switching transistor Q1 (not shown) connected to the primary winding N1. The square-wave voltage may be converted into a pseudo AC voltage by adjusting the positive and negative peak values thereof by means of a level shift means comprising the resistor R3 and constant voltage diode DZ shown in FIG. 1. A diode D4 is connected so that the voltage value of an AC voltage may not be varied in response to the variation of an input voltage. If unnecessary, the diode D4 may be excluded from the circuit.

Figure 5:
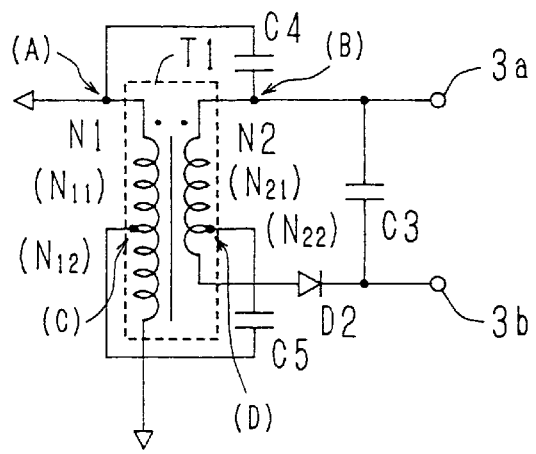
FIG. 5 is a partial circuit diagram of the third embodiment of a switching power supply in accordance with the present invention.

FIG. 5 shows part of the circuitry of the third embodiment of a switching power supply in accordance with the present invention. The circuit in FIG. 5, like the circuit in FIG. 4, shows a mere output-stage circuit portion beyond the transformer T1 and the secondary winding N2 of the transformer T1.

The primary winding N1 and secondary winding N2 of the transformer T1 in the circuit shown in FIG. 5 have a tap, respectively. The primary winding N1 is divided into areas $N_{11}$ and $N_{12}$ by the tap, and the secondary winding N2 is divided into areas $N_{21}$ and $N_{22}$ by the tap. The terminals (A) and (B) of the primary winding N1 and secondary winding N2 having the same polarity are connected via a capacitor C4. Winding positions (C) and (D) at which the taps of the primary winding N1 and secondary winding N2 are located are interconnected via a capacitor C5. Under these circumstances, the numbers of turns in the area $N_{11}$ and area $N_{21}$ are nearly the same with each other.

In the circuit shown in FIG. 2, the area $N_{11}$ of the primary winding N1 and the whole of the secondary winding N2 are equivalently connected in parallel with each other. By contrast, in the circuit shown in FIG. 5, the area $N_{11}$ of the primary winding N1 and only the area $N_{21}$ of the secondary winding N2 are connected in parallel with each other.

In this case, the area $N_{11}$ and area $N_{21}$ are equivalently connected in parallel with each other, and act to improve a coupling coefficient observed between the primary winding N1 and secondary winding N2. However, an equivalent coupling coefficient observed between the primary winding N1 and secondary winding N2 of the transformer T in the circuit shown in FIG. 2 in which the whole of the secondary winding N2 is utilized is much closer to 1.0 than that observed in the circuit shown in FIG. 5 in which part of the secondary winding N2 is utilized. Consequently, unless especially restricted, the circuitry shown in FIG. 2 is preferable to the circuitry shown in FIG. 5.

In the aforesaid first to third embodiments of the present invention, the capacitor C4 is connected to the terminals of the primary and secondary windings. However, as seen from the circuitry shown in FIG. 5, if each part area of the primary winding N1 and secondary winding N2 is equivalently connected in parallel with each other, a coupling coefficient observed between the windings is improved according to the size of the areas (number of turns). Therefore, the capacitor C4 need not always be connected to the terminals of the primary and secondary windings, but may, like the capacitor C5, be connected to taps formed on the windings. However, in this case, an area serving as part of the primary winding and an area serving as part of the secondary winding, which are connected in parallel with each other, must have the same number of turns with each other.

Figure 6:
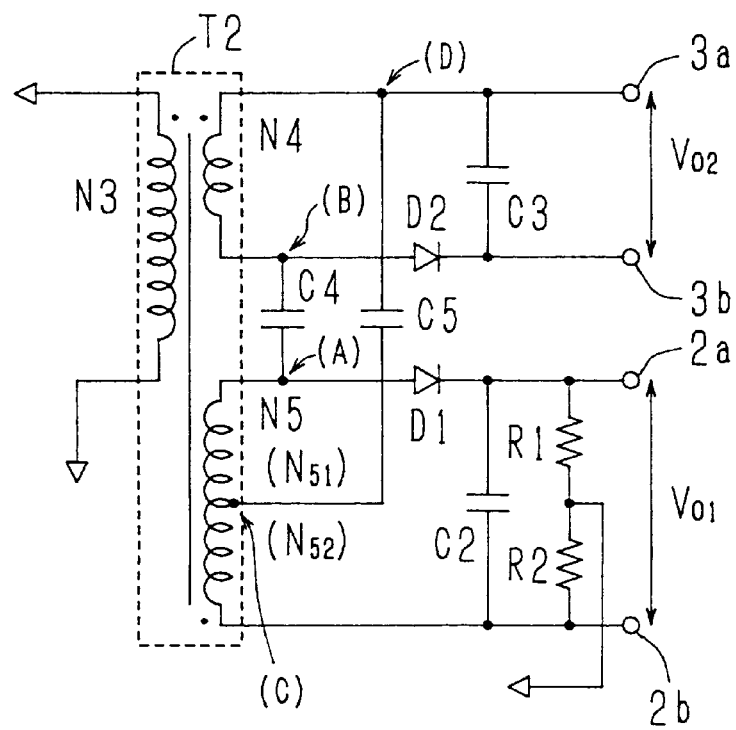
FIG. 6 is a partial circuit diagram of the fourth embodiment of a switching power supply in accordance with the present invention.

FIG. 6 shows part of the circuitry of the fourth embodiment of a switching power supply in accordance with the present invention.

In the circuit shown in FIG. 2, the primary winding N1, diode D1, capacitor C2, and switching transistor Q1 constitute a boost chopper type converter. In the circuit shown in FIG. 2, therefore, the output terminal 2a and the input terminal 1a are not isolated from each other. By contrast, in the circuit shown in FIG. 6, a transformer T2 having a primary winding N3, secondary winding N4, tertiary winding N5 is used to isolate the output terminal 2a from the input terminal 1a.

Furthermore, in the circuit shown in FIG. 6, one terminal (A) of the tertiary winding N5 of the transformer T2 is connected to one terminal (B) of the secondary winding N4, having the same polarity as the terminal (A), via a first capacitor C4. A tap located at a given winding position (C) of the tertiary winding N5 is connected to the other terminal (D) of the secondary winding N4 via a second capacitor C5. Herein, an area $N_{51}$ between the terminal (A) and winding position (C) of the tertiary winding N5 has nearly the same number of turns as the secondary winding N4.

Even in this circuitry, the capacitors C4 and C5 act substantially in the same manner as those in the circuitry shown in FIG. 2. As a result, the coupling coefficient observed between the secondary winding N4 and tertiary winding N5 may be improved and the regulation and cross-regulation of the second output voltage $V_{O2}$ may also be improved. However, in this case, the efficiency of the power supply is not improved so greatly as that of the power supply shown in FIG. 2.

For further improving the efficiency of the power supply having the circuitry shown in FIG. 6, measures described below must be taken. Specifically, the measures are at least either one such that a capacitor is, like that in the circuit shown in FIG. 2, connected between given winding positions of the primary winding N3 and secondary winding N4, or a capacitor is connected between given winding positions of the primary winding N3 and tertiary winding N5.

In the power supply units shown in FIGS. 2 to 5 in which the present invention is implemented, the primary winding N1 of the transformer T1, switching transistor Q1, diode D1, and capacitor C2 constitute a boost converter circuit. However, a power supply in which the present invention is implemented may have a buck-boost type converter circuit formed.

Figure 7:
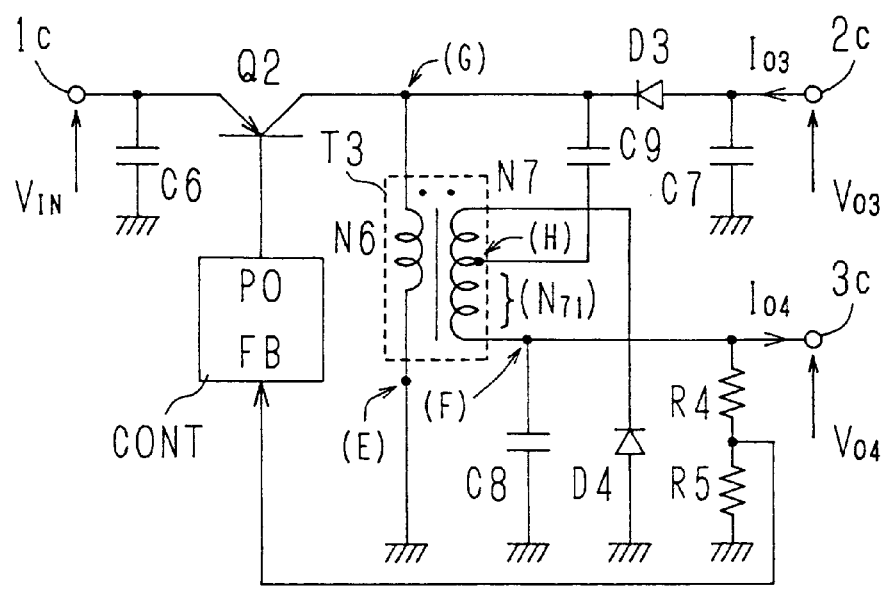
FIG. 7 is a circuit diagram of the fifth embodiment of a switching power supply in accordance with the present invention.

The circuit diagram of FIG. 7 shows the circuitry of the fifth embodiment of a switching power supply in accordance with the present invention. The circuit utilizes a buck-boost type converter circuit. An input terminal and output terminals shown in FIG. 7 are high-potential terminals or low-potential terminals. A reference-potential input terminal and output terminal are not shown.

The switching power supply shown in FIG. 7 has the configuration described below.

A switching transistor Q2 and a primary winding N6 of a transformer T3 are connected in series with each other between an input terminal 1c and a reference potential point (hereinafter, a ground). The base of the switching transistor Q2 is connected to a pulse output terminal PO of a control circuit CONT. A node between the primary winding N6 and switching transistor Q2 is connected to a first output terminal 2c via a diode D3. A capacitor C7 is connected between the first output terminal 2c and ground. The switching transistor Q2, primary winding N6, diode D3, and capacitor C7 constitute a buck-boost type converter circuit. Herein, a terminal of the primary winding N6 that is grounded shall be a terminal (E) and a terminal thereof connected to the switching transistor Q2 shall be a terminal (G).

One terminal (F) of a secondary winding N7 of the transformer T3 having the same polarity as the terminal (E) of the primary winding N6 is connected to a second output terminal 3c. Furthermore, the one terminal (F) of the secondary winding N7 is grounded via a smoothing capacitor C8. The other terminal of the secondary winding N7 is grounded via a diode D4. A series circuit composed of resistors R4 and R5 is connected between the second output terminal 3c and ground. A node between the resistors R4 and R5 is connected to a voltage detection terminal FB of the control circuit CONT. The secondary winding N7, diode D4, and capacitor C8 constitute a flyback converter circuit in cooperation with the primary winding N6 and switching transistor Q2.

A tap is located at a given winding position (H) of the secondary winding N7. The tap is connected to the other terminal (G) of the primary winding N6 via a second capacitor C9. Herein, a winding area $N_{71}$ defined between the terminal (F) and winding position (H) has nearly the same number of turns as the primary winding N6.

The switching power supply shown in FIG. 7 having the foregoing configuration produces a first output voltage $V_{O3}$ by using a voltage induced in the primary winding N6 of the transformer T3 and a voltage induced in the winding area $N_{71}$ of the secondary winding N7 by the capacitor C9 and smoothing capacitor C8.

Figure 8:
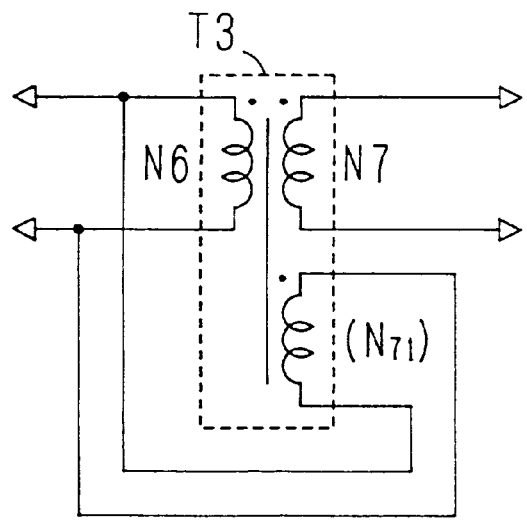
FIG. 8 is an equivalent circuit diagram in which a transformer, first capacitor and second capacitor are regarded as one transformer.

Taking into consideration the operation of the two supplies of AC power, an equivalent circuit of the circuit portion composed of the transformer T3, capacitor C9, and smoothing capacitor C8 can be regarded as one transformer which has the circuitry shown in FIG. 8. Specifically, the transformer includes three windings, that is, the primary winding N6 serving as an input winding, the secondary winding N7 serving as an output winding magnetically coupled with the input winding, and the area $N_{71}$ AC-connected in parallel with the primary winding N7. The equivalent circuit shown in FIG. 8 can provide substantially the same operation and advantage as the equivalent circuit shown in FIG. 3.

When the given terminals of the primary winding N6 and secondary winding N7 of the transformer T3 are interconnected via the smoothing capacitor CB, and the given terminal of the primary winding N6 and the given winding position of the secondary winding N7 are interconnected via the capacitor C9, an equivalent coupling coefficient observed between the primary winding N6 and secondary winding N7 can be improved drastically in comparison with that observed when the capacitor C9 is not connected. When the coupling coefficient observed between the primary winding N6 and secondary winding N7 of the transformer T3 is improved, the efficiency of the power supply is improved, and at the same time, the regulation and cross-regulation of the first output voltage $V_{O3}$ can be improved.

Incidentally, the circuit shown in FIG. 2 has the area $N_{11}$ and secondary winding N2 which are AC-coupled by two capacitors C4 and C5, while the circuit shown in FIG. 7 has the area $N_{71}$ and primary winding N6 which are AC-coupled by the smoothing capacitor C8 and capacitor C9. Since the smoothing capacitor C8 is shared for coupling and smoothing, the circuit shown in FIG. 7 has the advantage that the number of circuit elements is smaller than the number of circuit elements of the circuit shown in FIG. 2.

Figure 9:
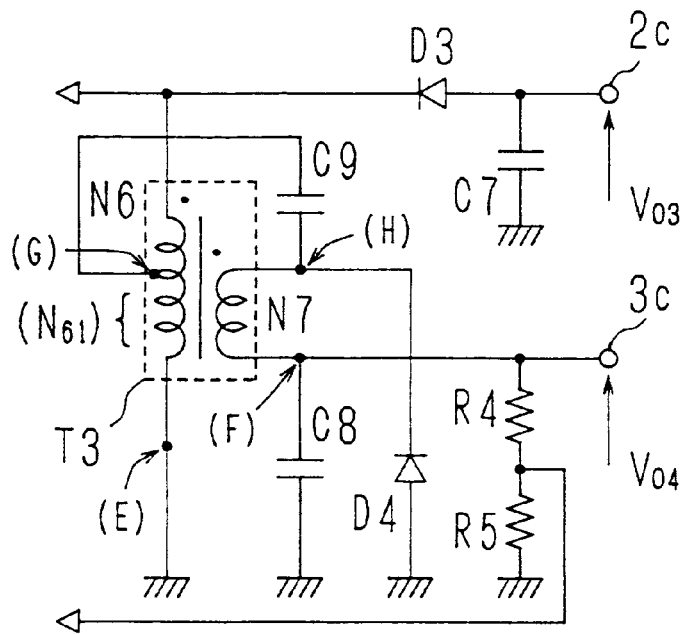
FIG. 9 is a partial circuit diagram of the sixth embodiment of a switching power supply in accordance with the present invention.
Figure 10:
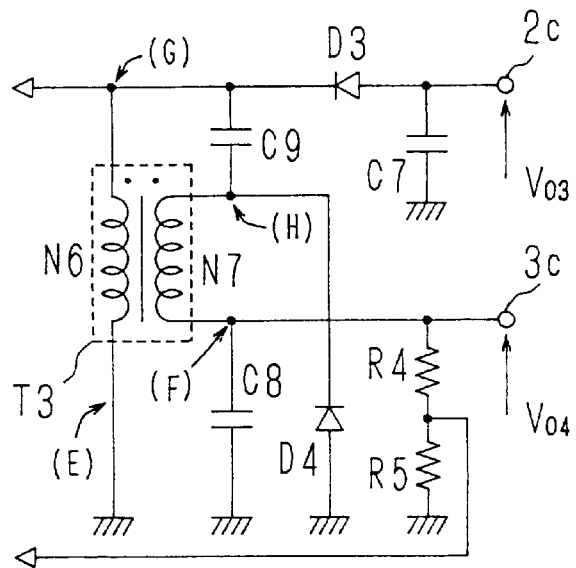
FIG. 10 is a partial circuit diagram of the seventh embodiment of a switching power supply in accordance with the present invention.

FIGS. 9 and 10 show parts of the sixth and seventh embodiments of switching power supplies in accordance with the present invention. In FIGS. 9 and 10, a circuit portion having the same configuration as that in FIG. 7 is not shown.

The configurations of the circuits shown in FIGS. 9 and 10 are different from that of the circuit shown in FIG. 7 in points described below.

In the circuit shown in FIG. 9, contrary to the circuit shown in FIG. 7, a tap is provided at a given winding position (G) of the primary winding N6. The tap is connected to one terminal (H) of a secondary winding N7 via a second capacitor C9. Herein, a winding area $N_{61}$ of the primary winding N6 between one terminal (E) and the winding position (G) has substantially the same number of turns as the secondary winding N7.

In the circuit shown in FIG. 10, a second capacitor C9 is connected between one terminal (G) of a primary winding N6 and one terminal (H) of a secondary winding N7. In this case, the primary winding N6 and secondary winding N7 have the same number of turns.

These circuits are used properly as mentioned below according to the required conditions for output voltages. Specifically, the circuit shown in FIG. 7 is used when the absolute value of a second output voltage $V_{O4}$ is larger than the absolute value of a first output voltage $V_{O3}$. By contract, the circuit shown in FIG. 9 is used on the contrary to the circuit shown in FIG. 7 when the absolute value of the second output voltage $V_{O4}$ is smaller than the absolute value of the first output voltage $V_{O3}$. The circuit shown in FIG. 10 is used when the absolute value of the first output voltage $V_{O3}$ is the same with the absolute value of the second output voltage $V_{O4}$. In other words, the circuits shown in FIGS. 9 and 10 are realized to be modified ones of the power supply circuitry shown in FIG. 7 in accordance with the relationship between the output voltages $V_{O3}$ and $V_{O4}$.

Figure 11:
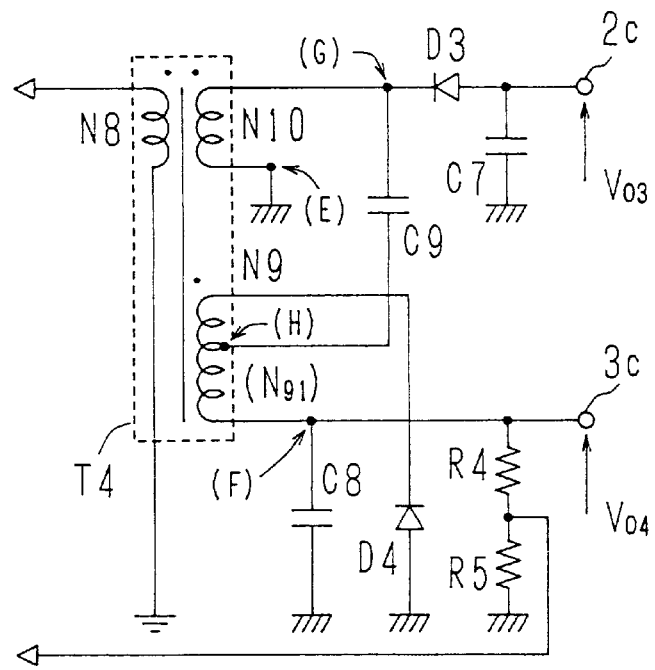
FIG. 11 is a partial circuit diagram of the eighth embodiment of a switching power supply in accordance with the present invention.

FIG. 11 shows part of the circuitry of the eighth embodiment of a switching power supply in accordance with the present invention.

In the circuit shown in FIG. 11, one terminal (E) of a tertiary winding N10 of a transformer T4 is grounded. One terminal (F) of a secondary winding N9 having the same polarity as the one terminal (E) of the tertiary winding N10 is grounded via a smoothing capacitor C8. A tap provided at a given winding position (H) of the secondary winding N9 and the other terminal (G) of the tertiary winding N10 are interconnected via a second capacitor C9. Herein, a winding area $N_{91}$ between the winding terminal (F) of the secondary winding N9 and the winding position (H) has substantially the same number of turns as the tertiary winding N10.

The circuit shown in FIG. 11 is produced by applying the technological idea of the circuit shown in FIG. 7, in which the smoothing capacitor C8 is shared for coupling and smoothing, to the circuit shown in FIG. 6. Since a first DC output $V_{O3}$ can be obtained from a winding other than the primary winding N8 serving as an input winding, an input terminal 1c (not shown) can be electrically isolated from output terminals 2c and 3c.

The first to eighth embodiments of the present invention have been described so far. The circuitry of a switching power supply in accordance with the present invention is not limited to the circuitry shown in FIGS. 2 to 11.

In practice, a converter circuit for producing each output voltage may be of an isolated type or an non-isolated type. Moreover, the converter may adopt a self-oscillation system or separate-oscillation system.

In the description of the embodiments of the present invention, the switching power supply (PS) is a power supply for providing two kinds of output voltages. However, the present invention can apply to a multi-output type switching power supply for providing three or more kinds of output voltages. Moreover, the present invention can apply to a single-output type switching power supply for providing only one kind of output voltage by a secondary winding. However, when the present invention is implemented in the single-output type switching power supply, the improvement only in efficiency can be expected.

Furthermore, in order for the control circuit CONT to constant voltage control, in the first to fourth embodiments, the first output voltage $V_{O1}$ is detected and in the fifth to eighth embodiments, the second output voltage $V_{O4}$ is detected. However, in these embodiments, the other output voltages may be detected.

A load device to which power is supplied from a switching power supply of the present invention is not limited to a fluorescent display tube referred to in the description of the prior art. The power supply can supply power to various load devices by matching the output specifications thereof with the requirements of the load devices. Needless to say, a plurality of load devices may be connected.

As described previously, given winding portions of two windings equivalently connected in parallel with each other via two capacitors, for example, the area $N_{11}$ and secondary winding N2 in FIG. 2 have nearly the same number of turns. This is intended that theoretically the values of voltages induced in the given winding portions of the two windings would be nearly the same. However, such a phenomenon may take place that even when the given winding portions of two windings are produced to have the same numbers of turns, the voltage values of the voltages induced in the given winding portions of the windings are not mutually identical. One thinkable cause of the phenomenon is a voltage drop caused by impedance given by a winding and a current flowing through a winding. For counteracting the phenomenon, it is also possible to set a state in which the numbers of turns in the given winding portions of two windings are nearly the same with each other but not exactly the same with each other.

EFFECT OF THE INVENTION

As described so far, according to the present invention, given positions (A) and (B), and (C) and (D) of windings of an inductance part are interconnected via first and second capacitors, respectively. Areas of the windings located between the first and second capacitors have nearly the same number of turns with each other. When a smoothing capacitor for a switching power supply can be utilized, the smoothing capacitor may be used as the first capacitor. The smoothing capacitor is connected between the given positions (E) and (f) of the windings, and the second capacitor is connected between the given positions (C) and (D). Herein, the areas of the windings located between the smoothing capacitor and second capacitor have nearly the same number of turns with each other. Owing to this configuration, the areas of the windings located between the first and second capacitors are equivalently connected in parallel with each other and a coupling coefficient observed between the windings approaches 1.0. As a result, the efficiency of the power supply can be improved and at the same time, the regulation and cross-regulation of an output voltage can be improved.

Thus, according to the present invention, there can be provided a switching power supply exhibiting high conversion efficiency and-high stability of output voltages.

I claim:

1. A switching power supply comprising a switching device, a control circuit, and an inductance part having at least first and second windings, for providing a plurality of output voltages from voltages induced in the at least first and second windings by operating the switching device, the first winding having at least first and second terminals, the first winding including at least one of first and third spaced winding positions, the first winding position being defined by either the first terminal or a tap, and the third winding position being defined by either the second terminal or a tap, the second winding having at least third and fourth terminals, the second winding including at least one of second and fourth spaced winding positions, the second winding position being defined by either the third terminal or a tap, and the fourth winding position being defined by either the fourth terminal or a tap, the first and second winding positions being interconnected via a first capacitor, the third and fourth winding positions being interconnected via a second capacitors wherein a number of turns between the first and third winding positions is approximately equal to a number of turns between the second and fourth winding positions, and wherein voltages at the first and second winding positions have the same polarity, and voltages at the third and fourth winding positions have the same polarity.

2. A switching power supply according to claim 1, wherein said first winding is a primary winding and said second winding is a secondary winding.

3. A switching power supply according to claim 1, wherein said first winding is a winding for outputting a DC voltage and said second winding is a winding for outputting an AC voltage.

4. A switching power supply according to claim 1, wherein the output voltages produced from the windings of said inductance part are controlled by monitoring a DC output voltage produced from a voltage induced in said first winding and controlling the DC output voltage so that the DC output voltage will remain constant.

5. A switching power supply comprising a switching device, a control circuit, and an inductance part having at least first and second windings, for providing a plurality of DC output voltages by rectifying and smoothing voltages induced in the at least first and second windings by operating the switching device, the first winding having at least first and second terminals, the first winding including at least one of first and third spaced winding positions, the first winding position being defined by the first terminal, and the third winding position being defined by either the second terminal or a tap, the second winding having at least third and fourth terminals, the second winding including at least one of second and fourth spaced winding positions, the second winding position being defined by the third terminal, and the fourth winding position being defined by either the fourth terminal or a tap, the first winding position being connected to a reference potential, the second winding position being connected to the reference potential via a first capacitor, and the third and fourth winding positions being interconnected via a second capacitor, wherein a number of turns between the first and third winding positions is approximately equal to a number of turns between the second and fourth winding positions, and wherein voltages at the first terminal of the first winding and the third terminal of the second winding have the same polarity, and voltages at the third and fourth winding positions have the same polarity.

6. A switching power supply according to claim 5, wherein said first capacitor is a smoothing capacitor.

7. A switching power supply according to claim 5, wherein said first winding is a primary winding and said second winding is a secondary winding.

8. A switching power supply according to claim 5, wherein the output voltages produced from the windings of said inductance part are controlled by monitoring a DC output voltage produced from a voltage induced in said second winding and controlling the DC output voltage so that the DC output voltage will remain constant.

9. A switching power supply comprising a switching device, a control circuit, and an inductance part having at least first and second windings, for providing a plurality of output voltages from voltages induced in the at least first and second windings by operating the switching device, the first winding having at least first and second terminals, the first winding including at least one of first and second spaced winding positions, the first winding position being defined by either the first terminal or a tap, and the third winding position being defined by either the second terminal or a tap, the second winding having at least third and fourth terminals, the second winding including at least one of second and fourth spaced winding positions, the second winding position being defined by either the third terminal or a tap, and the fourth winding position being defined by either the fourth terminal or a tap, the first and second winding positions being interconnected via a first capacitor, the third and fourth winding positions being interconnected via a second capacitor, wherein a voltage difference between the first and third winding positions of the first winding is approximately equal to a voltage difference between the second and fourth winding positions of the second winding, and wherein voltages appearing at the first and second winding positions have the same polarity, and voltages appearing at the third and fourth winding positions have the same polarity.

10. A switching power supply comprising a switching device, a control circuit, and an inductance part having at least first and second windings, for obtaining at least one output voltage from voltages induced in the at least first and second windings by operating the switching device, the first winding having at least first and second terminals, the first winding including at least one of first and third spaced winding positions, the first winding position being defined by either the first terminal or a tap, and the third winding position being defined by either the second terminal or a tap, the second winding having at least third and fourth terminals, the second winding including at least one of second and fourth spaced winding positions, the second winding position being defined by either the third terminal or a tap, and the fourth winding position being defined by either the fourth terminal or a tap, the first and second winding positions being interconnected via a first capacitor, the third and fourth winding positions being interconnected via a second capacitor, wherein a number of turns between the first and third winding positions is approximately equal to a number of turns between the second and fourth winding positions, and wherein voltages at the first and second winding positions have the same polarity, and voltages at the third and fourth winding positions have the same polarity.

11. A switching power supply comprising a switching device, a control circuit, and an inductance part having at least first and second windings, for obtaining at least one output voltage by rectifying and smoothing voltages induced in the at least first and second windings, the first winding having at least first and second terminals, the first winding including at least one of first and third spaced winding positions, the first winding position being defined by the first terminal, and the third winding position being defined by either the second terminal or a tap, the second winding having at least third and fourth terminals, the second winding including at least one of second and fourth spaced winding positions, the second winding position being defined by the third terminal, and the fourth winding position being defined by either the fourth terminal or a tap, the first winding position being connected to a reference potential, the second winding position being connected to the reference potential via a first capacitor, and the third and fourth winding positions being interconnected via a second capacitor, wherein a number of turns between the first and third winding positions is approximately equal to a number of turns between the second and fourth winding positions, and wherein voltages at the first and second winding positions have the same polarity, and voltages at the third and fourth winding positions have the same polarity.

12. A switching power supply comprising a switching device, a control circuit, and an inductance part having at least first and second windings, for obtaining at least one output voltage from voltages induced in the at least first and second windings of the inductance part by operating the switching device, the first winding having at least first and second terminals, the first winding including at least one of first and second spaced winding positions, the first winding position being defined by either the first terminal or a tap, and the third winding position being defined by the second terminal or the first tap, the second winding having at least third and fourth terminals, the second winding including at least one of second and fourth spaced winding positions, the second winding position being defined by either the third terminal or a tap, and the fourth winding position being defined by either the fourth terminal or a tap, the first and second winding positions being interconnected via a first capacitor, the third and fourth winding positions being interconnected via a second capacitor, wherein a voltage difference between the first and third winding positions of the first winding is approximately equal to a voltage difference between the second and fourth winding positions of the second winding, and wherein voltages appearing at the first and second winding positions have the same polarity, and voltages appearing at the third and fourth winding positions have the same polarity.

* * * * *